United States Patent [19]

Pellow

[11] Patent Number: 4,713,934
[45] Date of Patent: Dec. 22, 1987

[54] GAS TURBINE ENGINE AIR INTAKE

[75] Inventor: Terence R. Pellow, Watford, United Kingdom

[73] Assignee: Rolls-Royce plc, London, England

[21] Appl. No.: 438,636

[22] Filed: Nov. 2, 1982

[30] Foreign Application Priority Data

Nov. 21, 1981 [GB] United Kingdom ............... 8135122

[51] Int. Cl.⁴ .............................................. F02G 3/00
[52] U.S. Cl. .................................. 60/39.092; 55/306;
415/9; 222/541; 206/620; 206/634
[58] Field of Search ..................... 60/39.092; 55/306;
244/53 B, 121; 415/121 G, 9; 206/620, 622,
630, 634; 222/541

[56] References Cited

U.S. PATENT DOCUMENTS

| 2,802,618 | 8/1957 | Prachar . | |
|---|---|---|---|
| 3,148,043 | 9/1964 | Richardson et al. . | |
| 3,324,999 | 6/1967 | Farquhar | 206/620 X |
| 3,329,377 | 7/1967 | Peterson et al. . | |
| 3,952,972 | 4/1972 | Tedstone et al. . | |
| 3,971,218 | 7/1976 | Toth, Jr. et al. | 415/9 X |
| 4,346,860 | 8/1982 | Tedstone | 60/39.092 X |
| 4,378,069 | 3/1983 | Franco | 222/541 X |

FOREIGN PATENT DOCUMENTS

| 1116418 | 1/1982 | Canada | 60/39.092 |
|---|---|---|---|
| 3019397 | 12/1980 | Fed. Rep. of Germany . | |
| 3015651 | 10/1981 | Fed. Rep. of Germany . | |

Primary Examiner—Carlton R. Croyle
Assistant Examiner—Donald E. Stout
Attorney, Agent, or Firm—Cushman, Darby & Cushman

[57] ABSTRACT

An air intake for a gas turbine engine compressor comprises an arcuate primary duct which is in communication with the compressor of the gas turbine engine and which is provided with frangible wall portion. The frangible wall portion provides a barrier between the primary duct and a secondary duct and is so positioned and adapted as to be impacted and penetrated by a foreign body, such as a bird, which is above a predetermined weight and which has been ingested through the inlet of the primary duct. After penetrating the wall portion the foreign body passes through the secondary duct and is discharged therefrom at a location remote from the primary duct.

3 Claims, 5 Drawing Figures

GAS TURBINE ENGINE AIR INTAKE

This invention relates to a gas turbine engine air intake and in particular to a gas turbine engine air intake which is adapted to remove a heavy ingested foreign body, such as a bird, from the air flowing therethrough prior to that air entering the compressor of the engine.

The ingestion of heavy foreign bodies, such as birds, by gas turbine engines can result in serious damage and, in certain cases lead to a total engine shutdown. One solution to the problem of heavy foreign body ingestion has been to provide the engine air intake with an inertia separator which utilises the inertia of the body to direct it into an engine by-pass duct from whence it is jettisoned. This, however, is undesirable since it necessitates the provision of a permanent air flow through the by-pass duct which is detrimental to engine performance. Moreover, such by-pass ducts can be expensive to manufacture.

It is an object of the present invention to provide a gas turbine engine air intake which is adapted to remove a heavy ingested foreign body, such as a bird, from the air flowing therethrough and which, prior to ingestion of a heavy foreign body, is not detrimental to engine performance.

According to the present invention, an air intake for a gas turbine engine comprises a primary duct having an air inlet and an air outlet, said air outlet being adapted to deliver air from said primary duct to the compressor of a gas turbine engine, said primary duct being at least partially arcuate in form whereby any foreign body above a predetermined weight which is ingested through said air inlet impacts a portion of the wall of said primary duct, said internal wall portion being frangible and defining a barrier between said primary duct and a secondary duct, said secondary duct and frangible wall portion being so adapted and disposed that any such impacting body penetrates said frangible wall portion, enters said secondary duct and is subsequently discharged therefrom at a location remote from said primary duct.

Said portion of the wall of said primary duct is preferably rendered frangible by the provision of lines of weakness therein.

Said portion of said wall of said primary duct may be formed from a sheet of a light alloy, said lines of weakness being constituted by regions of reduced thickness of said sheet.

Said regions of reduced thickness of said sheet may be so arranged that when said sheet is penetrated by a foreign body, it divides along at least some of said lines of weakness to define a plurality of flaps, each of which remains attached to said sheet.

Said portion of the wall of said primary duct, said primary duct and said secondary duct are preferably so configured and dimensioned that said foreign body may be a bird.

Said air intake may be adapted to be located on the underside of a gas turbine engine.

The invention will now be described, by way of example, with reference to the accompanying drawings in which.

Figure 1:
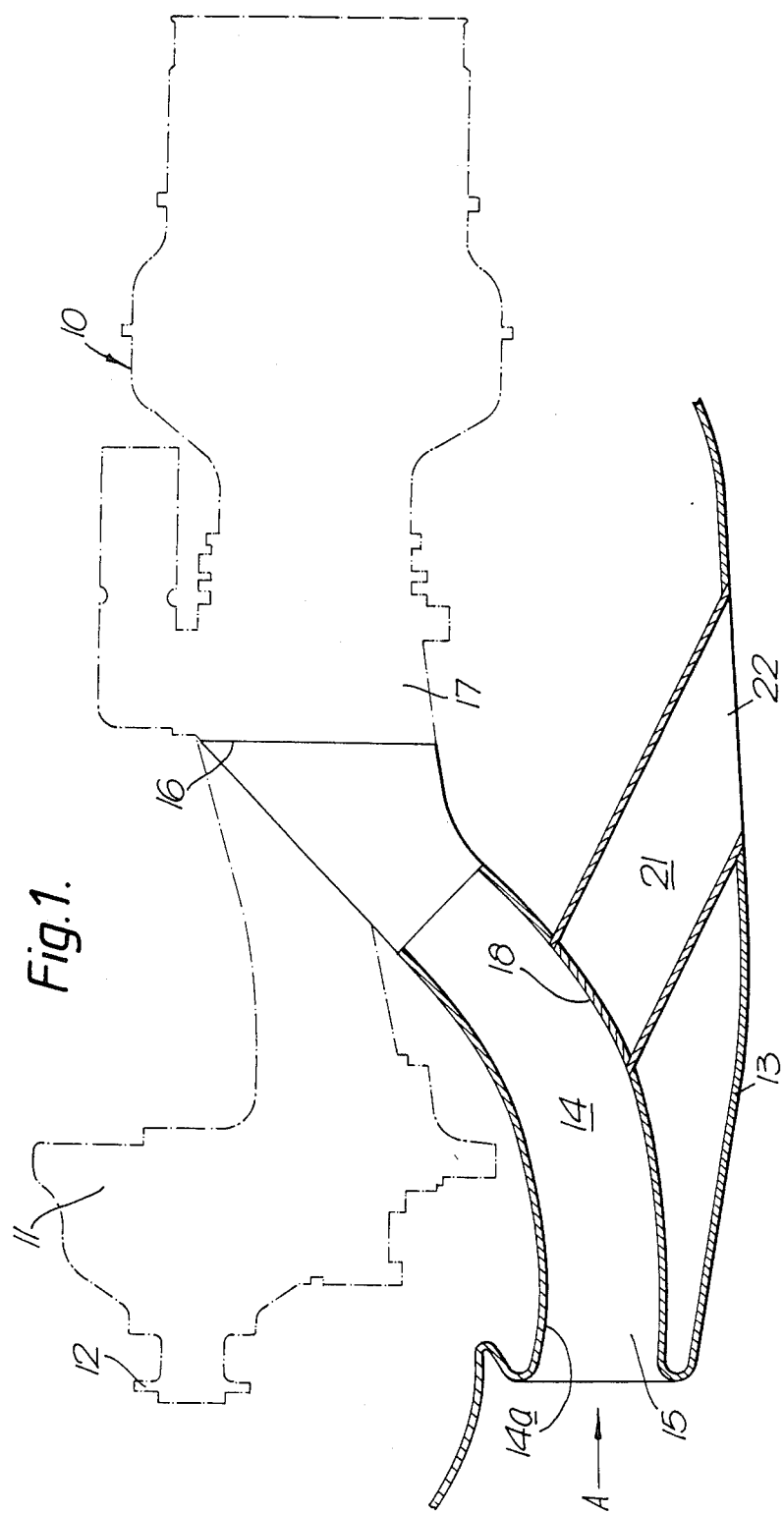
FIG. 1 is a sectional side view of an air intake in accordance with the present invention attached to a gas turbine engine.
Figure 2:
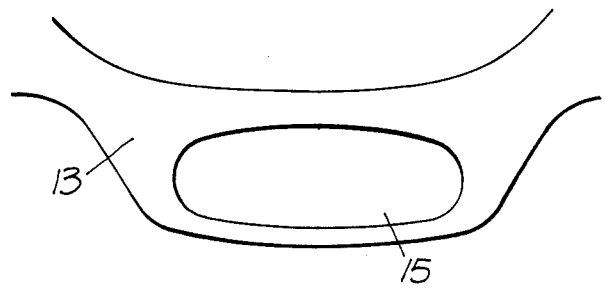
FIG. 2 is a view on arrow A of the air intake shown in FIG. 1.

With reference to FIG. 1 a gas turbine engine generally depicted by broken lines at 10 is provided with a reduction gearbox 11 having an output drive flange 12 for driving a propellor (not shown). The gas turbine engine 10 and its reduction gearbox 11 are enclosed within a nacelle 13, part of which is shown in FIG. 1. The nacelle 13 also contains a primary duct 14 which has an air inlet 15 and an air outlet 16. The air inlet 15, which can also be seen in FIG. 2, is of approximately elliptical cross-sectional shape and positioned below the reduction gearbox 11. The air outlet 16 is generally annular in form and is adapted to deliver air from the primary duct 14 to the compressor 17 of the gas turbine engine 10. Thus the primary duct 14 develops from the approximately elliptical shape of the air inlet 15 to the generally annular shape of the air outlet 16. It will be appreciated however that the air inlet 15 could be positioned above the reduction gearbox 11 if necessary.

In order to enable the air inlet 15 to be positioned below the reduction gearbox 11, the primary duct 14 is partially arcuate in form as can be seen in FIG. 1. Consequently, air which passes through the primary duct 14 on its way to the gas turbine engine compressor 17 is directed to follow a tortuous path. If the air passing through the primary duct 14 carries a foreign body, and if that body is above a certain weight, it will not follow the path of the air flow but will instead impact a portion 18 of the wall 14a of the primary duct 14.

Figure 3:
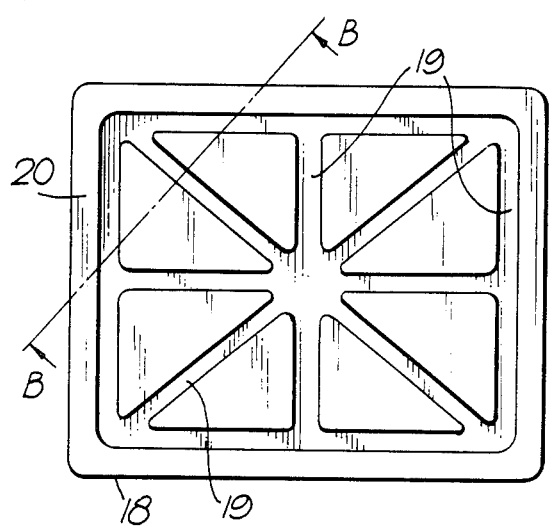
FIG. 3 is a view of the frangible portion of the air intake shown in FIG. 1.
Figure 4:
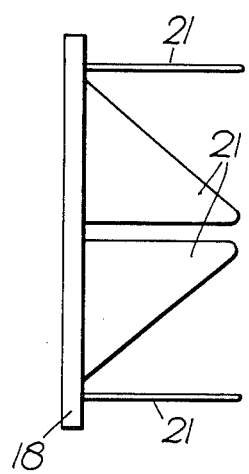
FIG. 4 is a side view of the frangible portion shown in FIG. 3 after it has been penetrated by a foreign body.
Figure 5:
FIG. 5 is a view on section line B—B of FIG. 3.

The portion 18 of the wall 14a which is impacted by any such foreign bodies above a certain weight is frangible so as to be penetrated by such bodies. More specifically the wall portion 18, which can be seen in more detail in FIG. 3, is made from an aluminium alloy sheet which has been weakened by the provision of lines of weakness 19 therein. The lines of weakness 19 are formed by chemically etching the wall portion 18 to provide local reductions in its wall thickness. The lines of weakness 19 are so arranged that those which are adjacent the periphery 20 of the wall portion 18 are of greater thickness than the remainder. This is so that if the wall portion 18 is impacted by a foreign body which is above a certain weight, it will divide in the manner shown in FIG. 4 to define a plurality of flaps 21 with the lines of weakness 19 of greater thickness acting as hinges whilst the remaining thinner lines of weakness 19 fracture.

The degree of curvature of the primary duct 14 and the thickness of the lines of weakness 19 in the wall portion 18 are selected so that the wall portion 18 is impacted and penetrated only by a foreign body which is above a predetermined weight. The value of this predetermined weight is selected so that any foreign body ingested through the air inlet 15 which is of such a weight as to be likely to damage the gas turbine engine 10 if it were to be ingested thereby impacts and penetrates the wall portion 18. The most common foreign body of such a weight which is likely to be encountered by a gas turbine engine is a bird. Consequently the wall portion 18 is so dimensioned that if it is so impacted, it opens to define an aperture which is sufficiently large to permit the passage of a bird therethrough.

The wall portion 18, when intact, also defines a barrier between the primary duct 14 and a secondary duct 21. The secondary duct 21 is also enclosed within the nacelle 13 and is provided with an outlet 22 on the undeside of the nacelle 13. The secondary duct 21 is downwardly inclined and so dimensioned that if a foreign body impacts and penetrates the wall portion 18, it passes into the secondary duct 21 and is subsequently discharged therefrom through the outlet 22.

It will be seen therefore that if a foreign body above a predetermined weight, such as a bird, is ingested through the air inlet 15, it impacts and penetrates the wall portion 18 before being discharged from the nacelle 13 through the secondary duct 21. Penetration of the wall portion 18 will of course create a by-pass flow for air entering the air inlet 15. However this will have only a small effect upon intake performance and consequently upon the performance of the gas turbine engine 10. The damaged wall portion 18 could then be replaced at the next convenient opportunity.

Although the present invention has been described with reference to a frangible wall portion 18 which is in the form of a weakened sheet of a light alloy material, it will be appreciated that other suitable frangible materials may be employed if it is so desired.

I claim:

1. An air intake for a compressor of a gas turbine engine comprising:

a primary duct defined by an annular wall, said primary duct having an air inlet for receiving air and an air outlet arranged to deliver air therefrom to the compressor of the gas turbine engine, said primary duct being at least partially arcuate in cross-sectional form whereby said air outlet is offset laterally from said air inlet and air flowing through said duct follows a tortuous path, a portion of said annular wall of said primary duct being frangible and being arranged to be impacted by any foreign body above a predetermined weight ingested through said air inlet, said frangible portion of said annular wall being formed by a sheet of light alloy having lines of weakness extending about and defining a periphery of the portion of said annular wall, said lines of weakness being defined by regions of reduced thickness in said sheet, and further lines of weakness in said sheet defined by regions of reduced thickness in said sheet, said further lines of weakness extending in said sheet from said lines of weakness defining the periphery of said portion and terminating together, said further lines of weakness being thinner than said lines of weakness defining said periphery of said portion whereby when said sheet is penetrated by a foreign body, said sheet divides along said further lines of weakness to define a plurality of flaps hinged to said wall by said lines of weakness extending about the periphery of said portion; and a secondary duct extending from said primary duct, said portion of said wall defining a barrier between said primary duct and said secondary duct, said secondary duct being arranged to receive said foreign body when said portion is penetrated.

2. An air intake for a compressor of a gas turbine engine as claimed in claim 1 wherein said portion of the wall of said primary duct, said primary duct and said secondary duct are so configured and dimensioned that said foreign body may be a bird.

3. An air intake for a compressor of a gas turbine engine as claimed in claim 1 wherein said air intake is located on the underside of a gas turbine engine.

* * * * *